United States Patent [19]

Lecour et al.

[11] Patent Number: 4,688,776
[45] Date of Patent: Aug. 25, 1987

[54] HYDROELASTIC SUSPENSION DEVICE FOR MOBILE SELF-LIFT DRILLING PLATFORMS

[75] Inventors: Pierre Lecour, le Kremlin-Bicetre; Gergely Korbuly, Chatou, both of France

[73] Assignee: Hutchinson S.A., Paris, France

[21] Appl. No.: 838,461

[22] Filed: Mar. 11, 1986

[30] Foreign Application Priority Data

Mar. 11, 1985 [FR] France .............................. 85 03529

[51] Int. Cl.$^4$ .............................................. F16F 1/36
[52] U.S. Cl. .................................. 267/140.1; 248/562; 267/140; 267/141.1
[58] Field of Search ............... 267/140.1, 63 A, 141.1, 267/141.3, 139, 140; 248/562, 636

[56] References Cited

U.S. PATENT DOCUMENTS

| | | | |
|---|---|---|---|
| 2,068,279 | 1/1937 | Piron | 267/63 A |
| 2,482,488 | 9/1949 | Julien | 267/63 A |
| 2,705,118 | 3/1955 | Beck | 248/10 |
| 2,854,232 | 9/1958 | Boschi | 267/141.1 X |
| 3,658,314 | 4/1972 | Luzsicza | 248/562 X |
| 3,844,002 | 10/1974 | Slemmons | 24/263 |
| 4,032,125 | 6/1977 | Minakawa et al. | 267/63 A |
| 4,378,936 | 4/1983 | Brenner | 267/63 A X |
| 4,392,639 | 7/1983 | Konishi | 248/562 X |
| 4,416,445 | 11/1983 | Coad | 267/140.1 X |

FOREIGN PATENT DOCUMENTS

| | | |
|---|---|---|
| 2412628 | 9/1974 | Fed. Rep. of Germany . |
| 2021465 | 7/1970 | France . |
| 2203768 | 5/1974 | France . |
| 149436 | 11/1980 | Japan .................................. 267/140.1 |
| 1393188 | 5/1975 | United Kingdom . |

Primary Examiner—George E. A. Halvosa
Attorney, Agent, or Firm—Browdy and Neimark

[57] ABSTRACT

A suspension device for a mobile self-lift drilling platform, comprising a water-tight chamber deformable under the effect of the load supported by the legs of the platform, this chamber being intended to be filled with a pressurized liquid. The deformability of the chamber is provided by its side wall which is formed by a tubular elastomeric element, with a substantially vertical axis, which element is secured to an inner and an outer tubular coaxial metal guide frames for translationally and rotationally guiding its axial, lateral and angular deformations under the effect of the load as well as of possible accidental shocks. A laminated elastomer structure formed by a stack of elastomer layers alternating with metal plates, to which they are adhered, is housed inside the deformable water-tight chamber and ends with an upper metal plate comprising ribs, more particularly in the form of concentric rings, which are provided with orifices allowing communication between a volume of the chamber situated inside these rings and a volume of the same chamber situated outside thereof.

3 Claims, 5 Drawing Figures

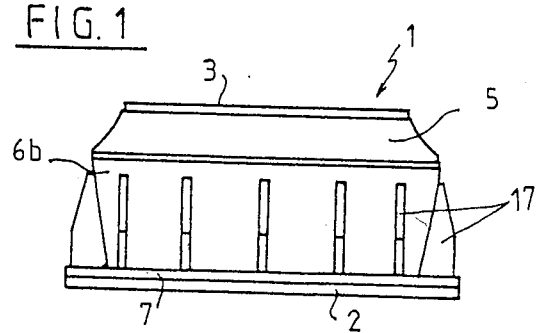
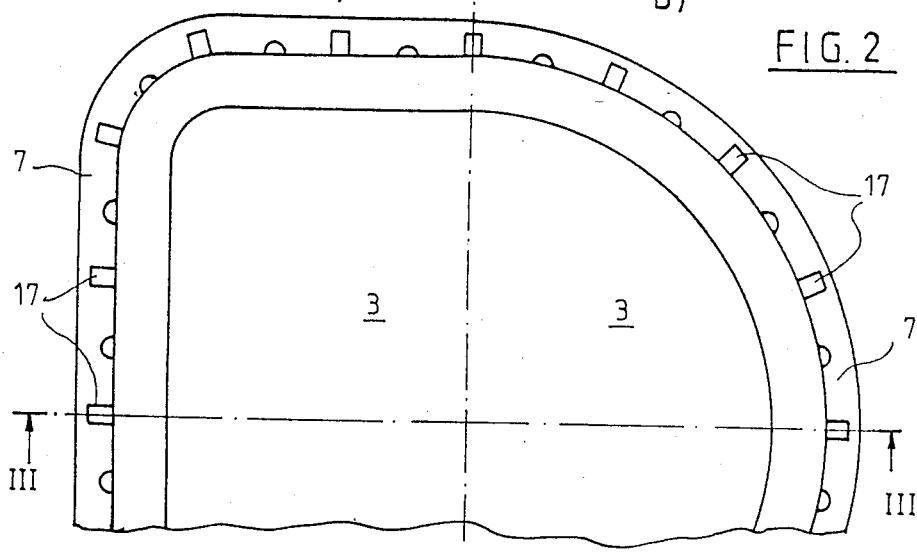
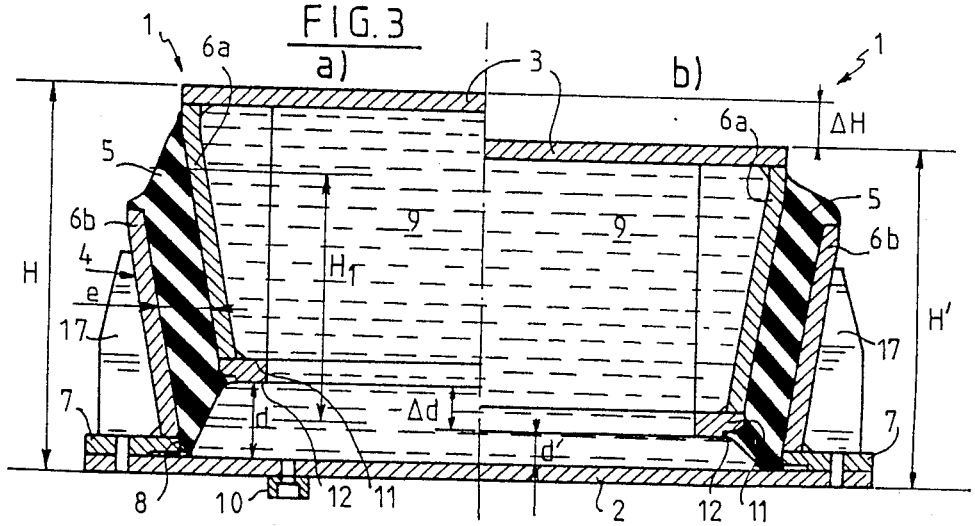

HYDROELASTIC SUSPENSION DEVICE FOR MOBILE SELF-LIFT DRILLING PLATFORMS

BACKGROUND OF THE INVENTION

1. Field of the Invention

The present invention relates to a suspension device for mobile self-lift drilling platforms.

2. Description of the Prior Art

Different methods are known for suspending a self-lift platform.

A first solution is represented by an elastomer device with laminated structure, namely comprising a stack of elastomer layers of appropriate thickness alternating with metal plates, to which they are adhered.

This laminated structure, which is resilient and so deformable, is intended to cooperate with a reduction system for raising and lowering the legs (or feet) of the self-lift platform, which system is of the rack and pinion type and is contained in a floating enclosure (several racks are integral with the same leg platform).

This laminated elastic structure is remarkable in that it withstands not only axial forces but also lateral forces.

A second solution uses a thick wall cushion (or pad) made from elastomer reinforced by means of high tensile strength steel wires, which cushion defines a deformable chamber intended to be filled with a pressurized liquid, such as a water and glycol solution for use at low temperatures. Each cushion of this type is connected (independently or jointly with the other cushions associated with the same leg of the platform) to a hydraulic accumulator for improving the shock absorption capacity.

By means of a pressure gauge, the load acting on the cushions and transmitted thereto by the legs of the platform may be checked, which further allows, on the one hand, the distribution of the loads supported by the different legs of the platform to be checked and, on the other hand, any variation of load due for example to the accidental sinking of a leg into a weakly resistant sea bed to be immediately detected and measured.

Each cushion or pad is further disposed between two metal plates for limiting its axial deformation, the transverse or lateral deformation being limited by axial projections on each plate;

The above described deformable hydraulic cushion may be used in place of said laminated elastic structure or in cooperation therewith.

(A third solution is also known which comprises the use of a system of connecting rods, but which is outside the scope of the present invention).

Now, it should be noted, particularly in so far as the deformable hydraulic cushion is concerned, that—although it is theoretically intended to replace said laminated elastic structure—in actual fact the cooperation between these two devices is, in practice, imperative because the suspension cushion is not adapted to withstand the lateral forces, whereas the laminated structure is capable of so doing.

It should be further noted that, because of the totally deformable structure of the suspension cushion, it is not capable of withstanding, for equal liquid pressure, the same load when—because of an imbalance of the platform (as can be verified, for example, in the case of accidental sinking of one or more legs of the platform into the sea bed)—the cushion increases in volume (in the case of said example, it is a question of the cushions associated with the leg or legs which are not concerned by the sinking): in fact, in this case the contact surface with said plates, which limit its axial deformation, decreases and consequently the force or load which it may support (the pressure being the same) decreases so that, for supporting the same load, the pressure would have to be increased as a function of the deformation, which is absolutely unthinkable with this hydraulic cushion.

SUMMARY OF THE INVENTION

The aim of the present invention is then to provide a suspension device for a mobile self-help drilling platform, for withstanding the load transmitted by the legs of the platform, which answers better the requirements of practice than the prior art devices provided for the same purpose, particularly in that:

besides the axial deformation, it also allows lateral and angular deformations, it is adaptable to the different conditions of use, particularly of the load and deformation, it also limits overloads, due more particularly to accidental impacts, it requires no maintenance or supervision, and its design is very simple.

The present invention provides then a suspension device for a mobile self-lift drilling platform, comprising a deformable water-tight chamber, particularly under the effect of the load supported by the legs of the platform, a pressurized liquid filling said chamber, a deformable side wall for said chamber comprising at least a tubular resilient element, with substantially vertical axis, providing the deformability of this chamber and being made more particularly from elastomer, and means to which said resilient tubular element is secured for translationally and rotationally guiding its axial and/or lateral and/or angular deformation, respectively, under the effect of said load as well as that of possible accidental shocks.

In an advantageous embodiment of the device of the invention, said means guiding the deformation of said tubular elastic element are formed by two coaxial tubular metal frames adhered to this elastic element, which separates them, one frame being disposed on the inside whereas the other frame is disposed on the outside, the two frames being secured to two substantially horizontal metal plates, one of which forms a lower support base whereas the other forms an upper support base and which are intended, on the one hand, to transmit said loads and said accidental impacts to the deformation guide frames and, on the other hand, to define said water-tight chamber in cooperation with these frames and said elastic element.

In a preferred arrangement of this embodiment, the internal guide frame is integral with the upper base, whereas the external guide frame is integral with the lower base.

In an advantageous mode of this arrangement, the external guide frame is secured to the lower base by means of an annular collar which is fixed, more particularly by welding, to the lower end of this external frame along the periphery of the central opening of this annular collar and which is intended to form a support for metal fins reinforcing said external frame, said collar being secured to the lower base by any appropriate means, more particularly by bolting.

Besides the above arrangements, the invention further comprises other arrangements which will be clear from the following description.

BRIEF DESCRIPTION OF THE DRAWINGS

The invention will be better understood from the following complement of description with reference to the accompanying drawings in which:

FIG. 1 shows a side elevational view of the device of the invention;

FIG. 2 shows two top half views relative to two possible configurations for the device of FIG. 1;

FIG. 3 is a view showing two vertical half-sections, through the plane III of FIG. 2, of the hydroelastic suspension device of the invention, in which the left-hand half-section corresponds to the rest condition, whereas the right-hand half-section corresponds to an operating condition for which an axial deformation of the device occurs—namely a variation (reduction) of the height of this device—which is intermediate between the absence of deformation and maximum deformation, this latter being limited by an appropriate stop means, one embodiment of which is also shown in this FIG. 3;

Figure 4:
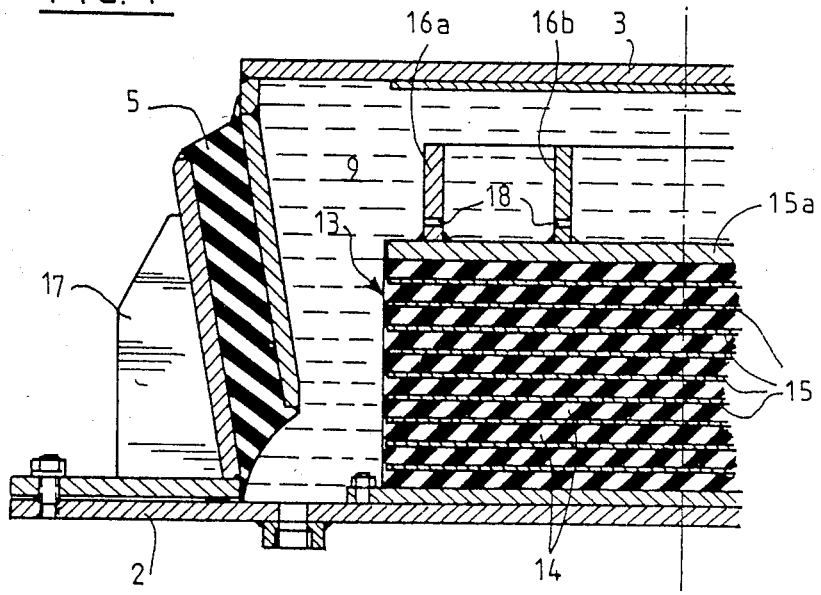
FIG. 4 shows a vertical half-section of a variant of the device shown in FIG. 3, this variant concerning the stop means for limiting the axial deformation.

It will, however, be readily understood that these drawings and the corresponding descriptive parts are given solely by way of illustration of the subject of the invention, of which they form in no way a limitation.

DESCRIPTION OF THE PREFERRED EMBODIMENTS

FIG. 1 shows an overall view of a hydroelastic suspension device according to the present invention, which is intended to provide a deformable connection between the deck and the legs of a mobile self-lift drilling platform (not shown).

It is formed essentially by a water-tight deformable chamber 1 which comprises (cf. FIG. 3):

a lower base 2, intended to bear on the floating enclosure (not shown) of a rack and pinion reduction system, the rack being fixed to a leg of the self-lift platform, an upper base 3, intended to bear against the deck of the platform (the forces applied to each leg of the platform being transferred through these bearing bases 2 and 3), and a deformable lateral wall 4 of composite structure, which is formed by:

a tubular elastomer element 5, preferably in the form of a truncated cone shaped ring, with vertical axis, which is adhered to two coaxial tubular metal frames 6a and 6b, one internal and the other external, respectively.

The internal frame 6a is fixed, more particularly by welding, to said upper base 3, whereas the external base 6b is fixed, also more particularly by welding, to said lower base 2 by means of an annular collar 7 welded to the lower end of the frame 6b along the periphery of its central orifice 8 and projecting outwardly parallel to base 2, to which it is fixed by any appropriate means, more especially by bolting. (Of course, this connection between the two frames and the two bases may be reversed, if required).

The external frame 6b is provided with reinforcing fins 17 (cf. FIG. 1), which bear on the fixing collar 7.

An appropriate liquid 9, formed more particularly by a water/glycol solution under pressure, is introduced into chamber 1 through the orifice 10 formed in the lower base 2 (it goes without saying that, in this case, the liquid intake orifice could be formed in the upper base 3).

A tubular elastomer ring 5, which is adhered to the two frames 6a and 6b, provides the following functions:
on the one hand, sealing of the chamber 1, and
on the other hand, a flexible resilient connection between the bearing bases 2 and 3, which operates like the return spring of a hydraulic jack, whereas the two frames 6a and 6b provide translational guiding of the tubular elastic element 5 during axial and/or lateral deformation of chamber 1, as well as the rotational guiding during possible angular deformation of this chamber 1, under the effect of loads or accidental shocks or impacts.

It is obvious that the horizontal section of the deformable chamber 1 may a priori have any shape, the choice between circular or rectangular (square) configurations depending on the space actually available (cf. FIGS. 2a and 2b), in these two cases the elastomer element constituting the deformable side wall of said deformable chamber being formed by a truncated cone shaped ring or a truncated pyramid shaped ring, respectively.

The deformable chamber 1 advantageously comprises a stop means for limiting in particular the axial deformation (which is the most considerable) of the tubular elastomer element 5.

In a first embodiment, this stop means is formed by an annular collar 11 (cf. FIG. 3) which is fixed, more particularly by welding, to the lower end of said internal guide frame 6a and which projects inwardly of chamber 1, which collar 11 is provided with a downwardly projecting shoulder 12 intended to come into abutment against the lower face 2, so as to limit the maximum axial deformation of chamber 1.

Alternatively, FIG. 4 shows a stop means which is formed advantageously by a laminated structure 13, of the above described type, that is to say formed by a stack of elastomer layers 14 of appropriate thickness adhered to metal plates 15, which structure is housed inside chamber 1 and is fixed to the lower base 2 thereof, more particularly by bolting or similar.

Preferably, the upper metal plate 15a of this laminated deformable structure 13 comprises ribs, in the form of concentric rings 16a, 16b of appropriate height, which are intended to further limit the axial deformation of chamber 1: thus, for a given maximum axial deformation, a laminated structure may be used of smaller height with a substantial saving material, while still having a minimum volume providing correct operating when it is filled with pressurized liquid 9.

It is advantageous to form in the wall of said rings (16a and 16b) orifices 18 providing communication between the volume inside these rings and the volume situated there-outside.

The solution which consists in housing said laminated structure 13 inside the suspension device of the present invention has, more particularly with respect to the prior art solution which also associates this structure with another suspension device but disposes it outside this latter, the additional advantage of space saving.

Figure 5:
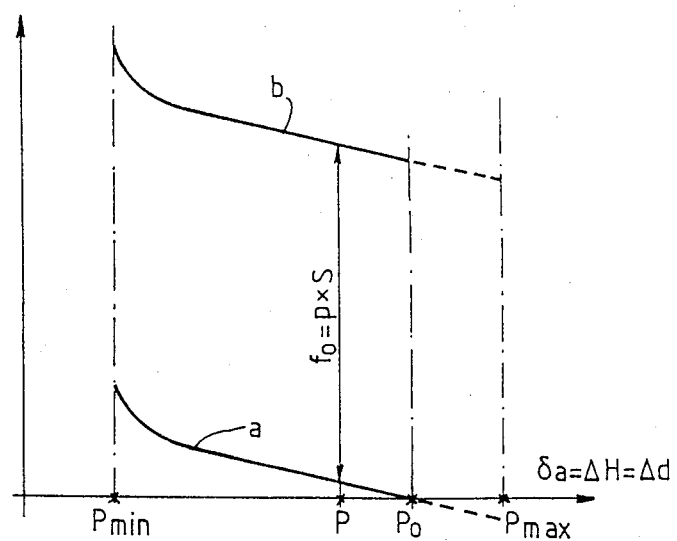
FIG. 5 shows two characteristic force/axial deformation characteristics for the device of the invention, in the case where it is devoid of pressurized liquid and in the case where it is filled with this pressurized liquid respectively.

FIG. 5 shows the trend of the force/axial deformation curve (f, δa) for the suspension device of the present invention.

Curve a refers to the case where the deformable chamber 1 does not contain any liquid, whereas curve b refers to the case where a pressurized liquid 9, of said above mentioned type, is introduced into this chamber through the orifice 10.

It can be seen that curve a is substantially linear in the accepted axial deformation γa range, which corresponds to the variation $\Delta H = H - H'$ of the axial dimension of chamber 1: H is the height of this chamber in the rest position $P_o$ (cf. FIG. 3a), whereas H' is the height of this same chamber under working conditions, P corresponding to an intermediate position (cf. FIG. 3b). This variation $\Delta H = \delta a$ is also defined by the variation $\Delta d = d - d'$, where d and d' are the distances of the annular abutment collar 11 (when this latter is present) from the lower base 2, under the two rest and work positions, respectively (cf. again FIGS. 3a and 3b): the point $P_{min}$ in the diagram of FIG. 5 corresponds to the position in which the deformable chamber 1 has a minimum height.

It will be noted that, on the assumption that a fluid under a constant pressure P' is introduced into chamber 1, curve b is obtained by a translational movement effected parallel to the axis of the ordinates (forces f) and defined, in magnitude, by the product of said constant pressure p multiplied by the area S of the upper base 3: in fact, corresponding to the rest position $P_o$, the suspension device of the invention is capable of withstanding a force $$f_o = p \times S,$$

without undergoing any axial deformation, because the load is exactly offset by the vertical thrust due to the fluid pressure.

Although the resilient elastomer element 5 works mainly under compression, it allows however a certain deformation (or travel) under tractive forces, which is shown by a broken line extension of curves a and b (although, obviously, it is a question here of a zone corresponding to quite exceptional operation: the point $P_{max}$ in the diagram of FIG. 5 corresponds to the position in which the deformable chamber 1 has a maximum height).

It is relatively easy to adapt the suspension device of the invention to different service conditions, namely to the effective load and to the accepted travel, while taking into account the fact that:
  for having the device support a higher load, it is sufficient:
  to increase the area S of the upper base 3 (and so of the lower base 2), while leaving the thickness e and the height $H_1$ of elastomer element 5 unchanged, or
  to increase the height $H_1$ of this elastomer element, while leaving said thickness and said area S unchanged, in both these cases the deformation or stroke of the elastomer element remaining unchanged, whereas
  for increasing the accepted deformation, it is sufficient to increase the thickness e of the elastomer element while leaving its height $H_1$ and said area S unchanged, but in this case the accepted load decreases.

It is interesting to emphasize that the hydroelastic suspension device of the invention has certain advantages with respect to the use (theoretically possible), of a hydraulic jack, more particularly in that:
  the disadvantages due to the friction of the sliding rod of such a jack against its seal is eliminated, this friction eventually causing loss of the required sealing due to wear of this seal, which would require continuous supervision and maintenance and would inevitably have a considerable influence on the final cost of a suspension installation using hydraulic jacks, whereas the device of the invention requires no maintenance, and
  there is no need to provide complex fixing systems, such as ball and socket joints, slides, etc . . . which would be required for a conventional hydraulic jack to effect, besides the normal axial movements, lateral and/or angular movements, since such a jack does not normally allow any of these movement.

It should also be noted that the deformable elastomer side wall of the water-tight chamber 1 limits the effect of overloads due to shocks because of its elasticity, which makes it capable of absorbing, at least partially, the variations of volume of this chamber 1 in the case of accidental shocks.

Moreover, it is obvious that the preferred shape of said tubular elastomer element is that of a truncated cone shaped ring; this ring may also be cylindrical.

In so far as the positioning of a mobile self-lift drilling platform (which is floating) is concerned, it lowers its legs in a conventional way, which legs come to bear against the sea bed, then it rises above the water by bearing on these same legs.

Since, during this positioning operation, the depth of the platform is subjected to the action of the sea, there are variations of level which are advantageously accommodated—and this again in a conventional way—by connecting the hydroelastic suspension device of the invention to a hydropneumatic accumulator, but with a remarkable difference with respect to the prior art suspension devices which is represented by a very low variation of the load on the legs due to the trend of the force/axial deformation curve of the device of the invention.

It goes without saying that, for using in the best manner possible the axial deformation capacities of the hydroelastic suspension device of the invention, it will be advantageous to progressively increase the pressure of the liquid inside its deformable chamber during positioning of the platform, without fear of the above mentioned problems arising due the hydraulic cushions of the prior art.

Once the platform has been installed, it is possible to carry out levelling of the platform by varying the volume of the fluid in the chamber of the hydraulic suspensions installed on the different legs, without the need to activate the rack and pinion reducing system.

A simple pressure gauge is all that is required to check the load acting on each leg: it is then possible to check the distribution of the loads over each of the suspensions. It is further possible to detect a variation of load (due for example to a leg sinking into a weakly resistant sea bed, with the consequent risk of a loss of stability).

In addition, if no locking system (known per se) is provided between the feet and the deck of the platform, it will be advantageous to adjust the volume of the pressurized fluid so as to be situated roughly between the minimum height of the deformable chamber and the height thereof at rest, and this under the static load of the installed platform.

As is clear from the foregoing, the invention is in no way limited to those of its embodiments and modes of application which have been described more explicitly; it embraces, on the contrary, all variations thereof which may occur to a technician skilled in the matter, without departing from the scope and spirit of the present invention.

What is claimed is:

1. A suspension device for a mobile self-lift drilling platform, comprising:
   a water-tight chamber filled with a pressurized liquid and having a side wall comprising at least a tubular elastomeric element, with substantially vertical axis, for providing the deformability of this chamber under the effect of the load supported by legs of the platform;
   means to which said tubular elastomeric element is secured for translationally and rotationally guiding its axial, lateral and angular deformations, respectively, under the effect of said load as well as that of possible accidental shocks;
   stop means for limiting the axial deformation of said tubular elastomeric element;
   said means for guiding the deformation of said tubular elastomeric element comprised of:
      substantially horizontal upper and lower metal bases;
      an inner tubular metal guide frame secured to said substantially horizontal upper metal base, and an outer tubular metal guide frame having an annular collar and secured to said substantially horizontal lower metal base through said annular collar;
      metal fins reinforcing said outer guide frame supported by said annular collar, said inner and outer guide frames being coaxial with said tubular elastomeric element, which separates them and to which they are secured;
   said upper and lower bases being intended to transmit said loads and said accidental shocks respectively to the inner and outer guide frames, while defining said water-tight chamber in cooperation with these guide frames and said tubular elastomeric element;
   said stop means consisting of a laminated elastomer structure, so deformable, formed by a stack of elastomer layers of predetermined thickness alternating with metal plates to which they are adhered, said laminated structure housed inside said deformable water-tight chamber and secured to said lower base thereof and having an end with an upper metal plate comprising ribs, in the form of concentric rings, intended to abut against said upper base of said deformable chamber and provided with orifices allowing communication between a volume of said chamber situated inside these ribs and a volume of said same chamber situated outside thereof.

2. The device as claimed in claim 1 wherein said tubular elastomer element is a truncated cone shaped ring.

3. The device as claimed in claim 1, wherein said tubular elastomer element is a truncated pyramid shaped ring.

* * * * *